3,519,465
EPOXY RESIN BONDED TO CURED SILICONE RUBBER AND METHOD OF FORMING

Marvin E. Lyles, Garden Grove, Calif., assignor to Beckman Instruments, Inc., a corporation of California
No Drawing. Continuation of application Ser. No. 492,873, Oct. 4, 1965. This application June 28, 1968, Ser. No. 745,073
Int. Cl. B44d 1/14; B32b 27/38
U.S. Cl. 117—47                     10 Claims

ABSTRACT OF THE DISCLOSURE

A bond is formed between a surface of cured silicone rubber and an epoxy resin overcoat by applying a thin layer of primer to the silicone rubber, allowing it to stand for about half an hour, and wiping off. The desired polymerizable epoxy resin is placed onto the so-treated area and allowed to cure. The primer comprises an epoxy material, a vinyl aromatic material, and a vinyl silane, the latter two capable of cross-linking with the epoxy material. The treatment enables a firm bond to be made.

---

This application is a continuation of application Ser. No. 492,873 filed Oct. 4, 1965, and now abandoned.

This invention relates to the bonding of epoxy resins to silicone rubber and more particularly provides a primer composition permitting the bonding, a process for achieving the bonding, and a resulting structure.

Silicone rubber in appearance is substantially indistinguishable from organic rubber. The rubber stretches, bounces, sheds water, and can be formed into sheets, extruded into tubing, and molded into intricate forms. The rubber contains no plasticizer and a principal advantage of the silicone rubbers is their ability to retain their rubber characteristics over a wide span of temperatures, including high and low, where conventional organic rubbers will lose their properties and cease to function. The silicone rubbers are resistant to many solvents and possess physiological inertness, which in combination with their other unusual physical properties has prompted their use in various medical and pharmaceutical applications. Silicone rubbers will burn but with difficulty and they are resistant to most basic, weak acids and salt solutions.

A principal disadvantage in the use of cured silicone rubbers heretofore has been the absence of a suitable technique for bonding the rubber to an epoxy system. Epoxy resins possess an outstanding combination of properties and the epoxy resins are widely employed as adhesives and in protective coatings and structural plastics. Epoxy resin adhesives find wide use in applications where high bond strengths are required and for bonding various materials to metals, glass, and plastics in applications where adhesion is critical. It will thus be appreciated why it would be so advantageous to be able to bond silicone rubber to an epoxy coating or structure or to utilize an epoxy resin adhesive in the bonding of the rubber to other materials.

It is a principal object of the invention to provide a process and composition permitting the bonding of epoxy resins to cured silicone rubbers.

It is another object of the invention to provide a primer composition which will permit the use of an epoxy adhesive with a silicone rubber structure.

It is a still further object of the invention to provide a structure comprising an epoxy resin bonded to silicone rubber.

It is another object of the invention to provide a primer composition for use with an epoxy adhesive wherein polymerization of the components of the primar composition is initiated by the epoxy adhesive during its curing cycle.

It is a further object of the invention to utilize the property of silicone rubber to swell in the presence of aromatic solvents as a means for physically trapping a polymerizable substance which is capable of reacting with an epoxy adhesive or bonding to other epoxy resin materials.

Other objects and advantages will become apparent hereinafter to those skilled in the art.

Epoxy resins are not compatible with cured silicone rubber and heretofore it has not been possible to bond the two materials together or to utilize an epoxy resin as a means for bonding silicone rubber to other material such as glass or metal. This has been a serious shortcoming in the use of silicone rubber as there are many applications where it would be highly desirable to form an inert, high strength bond of the type available through use of an epoxy resin adhesive.

The primer composition of the invention incorporates a liquid epoxy resin system which may be only a liquid resinous epoxy material but more often that material is used in combination with a coupling reagent, usually a polyfunctional material, such as an aromatic acid anhydride. The primer composition generally includes a normally liquid aromatic material, typically toluene, which has the property of penetrating and swelling the silicone rubber and which is characterized by being soluble with the epoxy resin system. The composition also contains a vinyl material which is soluble with both the aromatic material and the resinous epoxy. Suitable vinyl materials include normally liquid vinyl aromatics such as para-vinyl toluene and normally liquid vinyl silanes. Among the vinyl silanes which may be employed are vinyl tris (2-methoxyethoxy) silane, vinyl trimethylsilane, vinyl triphenylsilane, divinyl dimethylsilane, and vinyl dimethyl silanediol; both the vinyl aromatic and vinyl silane are employed in a preferred formula.

The toluene or other normally liquid aromatic material serves as a solvent and carrier for other components of the primer composition. The toluene, as other aromatic materials, has the ability of penetrating the silicone rubber and causing swelling. In the instance of a volatile aromatic such as toluene, the swelling is not permanent but the ability to so penetrate and swell and introduce the vinyl-containing solute to the silicone rubber is fundamental to the formation of the bond of the invention. The vinyl material desirably is made up of both a vinyl aromatic such as vinyl toluene and a vinyl silane. The vinyl silane "wets" the silicone rubber's surface, thus facilitating swelling by the aromatic, and acts as a solvent to dissolve the lower molecular weight silicones at the rubber surface. The vinyl toluene which is preferably the para-isomer also swells the silicone rubber; however, that portion of the vinyl toluene within the rubber remains entrapped which is not true of the toluene solvent as the latter readily evaporates. It is possible, although not desirable, to delete the toluene from the formula of the composition and employ the p-vinyl toluene or other vinyl aromatic solvent for the components of the composition; here the vinyl toluene will serve in the dual role of providing vinyl groups and as a solvent-carrier penetrant of the rubber. The vinyl groups are eventually reacted when the polymerization of the epoxy resin system is initiated and these groups enter into the forming of a cross-linked polymer which is firmly embedded in the silicone rubber. The two vinyl substances of the preferred primer, namely, the vinyl silane and vinyl toluene, will upon polymerization of the primer undergo some reaction between themselves but will primarily react with the epoxy resin.

It is through that there is some chemical reaction between the silicone rubber and the resulting cross-linked polymer of the primer but for the most part the bonding between the rubber and primer is of mechanical rather than a chemical nature. The foregoing is a simplified version of the probable mechanism of the bonding of the primer composition to the silicone rubber.

It will be appreciated that, since the primer composition contains a liquid resinous epoxy material capable of polymerization, there is a substance present which is susceptible of bonding or adhering to an epoxy resin overcoat such as an adhesive under suitable conditions. The bond between the eventually polymerized primer composition and the epoxy resin overcoat whether it be an adhesive or an epoxy resin structure is of a chemical nature.

The formula for the epoxy-silicone primer of the invention desirably contains a small amount of a substance such as silicon dioxide which is capable of imparting a gel structure to the primer composition. It is felt that, at higher temperatures, some of the silicon dioxide forms a reactive interface with the silicone and epoxy. The role of the silicon dioxide is, however, primarily as a gelling agent and a dispersant and not as a bonding agent.

The epoxy resinous system of the primer composition may take various forms. It may simply be made up of an epoxy resin monomer but, preferably, the system will also include a polyfunctional coupling reagent for reaction with the epoxy resin monomer to form upon subsequent polymerization of the primer a hard, infusible, cross-linked polymer. Such reagents are known in the epoxy art as hardeners. The polyfunctional reagent will be supplied in an amount adequate to provide the desired properties in the cross-linked polymer. Various polyfunctional reagents are available for the coupling process, including amines, both aliphatic and aromatic polyamines, amine salts, and polysulfide compounds, but preferably the polyfunctional reagent takes the form of an acid anhydride, usually an aromatic acid anhydride such as phthalic anhydride. Other available anhydride hardener compounds include dodecenylsuccinic anhydride and pyromellitic dianhydride. The coupling process for curing of an epoxy resin is preferred to a catalytic polymerization reaction of an epoxy resin monomer but the latter may be employed, though the resulting resin is generally somewhat inferior. The amount of the coupling reagent employed is that required to provide the desired properties in the cross-linked polymer which will usually be a stoichiometric or near stoichiometric amount.

The vinyl-containing materials are present in the primer composition in amounts adequate to accomplish bonding of the epoxy resin overcoat to the silicone rubber. Typically the vinyl aromatic material is provided in an amount within the range of .5 to .8 part (preferably .65 to .7) by weight per part of the resinous epoxy material and the vinyl silane is provided in an amount within the range of .5 to 1 part (preferably .7 to .8) by weight per part of the resinous epoxy material. Where toluene or other volatile liquid aromatic solvent is provided, it will be supplied in an amount adequate to serve as a carrier for the other components of the primer composition and here typically is supplied in an amount within the range of .2 to 5 parts by weight per part of the resinous epoxy material. Where a coupling reagent, typically a polyfunctional material such as an aromatic acid anhydride, is employed it will generally be provided in an amount within the range of .8 to 1.3 parts (preferably .9 to 1.1) by weight per part of resinous epoxy material.

The silicon dioxide component of the composition is optional and will be used where it is desirable to have a gel structure and will be provided in an amount needed to give the desired structure to the primer composition, typically within the range of 4 to 6 parts by weight per part of the resinous epoxy material.

The primer composition of the invention is stable at room temperature but will react in the presence of other epoxy systems which are going through their curing cycle.

The concept underlying the composition and process of the invention relies on the presence of a resinous epoxy material, a vinyl compound and a liquid aromatic material, which is capable of swelling the silicone rubber and solubilizing the vinyl material and the epoxy resin. The aromatic solvent is responsible for entrapping its solutes within the silicone rubber and upon subsequent polymerization the entrapped solutes form a physical bond between the rubber and the primer. The epoxy resin also during the subsequent polymerization bonds to the overlying epoxy overcoat (which may be an adhesive), thus completing the bond structure. There is also cross-linking between the vinyl material and the epoxy resin during polymerization. In an alternative approach, the roles of the aromatic solvent and the vinyl material are provided in a single compound, but more desirably the aromatic solvent is low boiling (such as p-toluene) and the vinyl group is introduced by use of both a vinyl aromatic and a vinyl silane.

The epoxy-silicone primer of the invention may be employed in the following procedure. The surface of the silicone rubber bonding area is thoroughly cleaned with acetone, toluene or other suitable solvent and optionally may be abraded at this time by using 320 grit emery paper through application of only light pressure to the bonding area. In an alternative procedure, the abrading is carried off after the application of the primer. Loose silicone rubber, if any, resulting from the abrasion is removed by wiping with a clean tissue wet with solvent. The primer is then applied over the area to be bonded to a thickness of about .060 to .100 of an inch. The primer is left in place on the silicone rubber for 20 to 30 minutes, during which time the volatiles of the composition will largely evaporate. At the end of the 20–30 minute interval, the primer is removed with a dry tissue. The treated area should appear wet and slightly milky in color. If a pink or red color is present, the excess primer has not been removed. Preferably, the primer composition incorporates a small amount of red coloring to serve as an indicator for this purpose. Cleaning of the bonded surface with a solvent must be avoided. However, if it should become necessary for some reason to reclean the surface with a solvent, the area should be retreated with primer, and the excess primer then removed after 30 to 45 seconds.

As the next step the epoxy adhesive or other epoxy system, whether it be a coating or structure or an adhesive, is provided in an activated, polymerizable state over the treated area. The applied epoxy, being in its curing cycle, will initiate polymerization of the primer composition to form a bond between the silicone rubber and the overlying epoxy overcoat whether it be an epoxy adhesive, an epoxy coating, or possibly other epoxy structure. It will thus be seen thta the polymerization of the primer composition accompanies or coincides with the curing cycle of the epoxy resin overcoat. It will be apparent that in the instance, where the epoxy overcoat is an epoxy resin, there will be still another laminate, namely, the material that is being bonded to the silicone rubber.

The following is a preferred formula for the epoxy-silicone primer of the invention:

| | Parts by weight |
|---|---|
| Toluene | 5 |
| 1-epoxyethyl-3,4 epoxycyclohexane | 2.5 |
| Aromatic acid anhydride hardener | 2.5 |
| Vinyl tris (2-methoxyethoxy) silane | 1.0 |
| p-Vinyl toluene | 1.5 |
| Silicon dioxide | 8 |

It will be appreciated that an effective formula may be prepared even though there are variations from the foregoing formulations. The chemicals are mixed at room temperature in the sequence of the formulation. The mixture will have a shelf-life at 25° C. of approximately three months. Therefore, it is recommended that the primer be stored in refrigeration. The primer should be used in a well ventilated room and contact of the composition with the skin avoided.

The composition of the invention satisfies an increasing need for a technique for bonding epoxy potting compounds or epoxy adhesive to cured silicone rubber. The increasing use of silicone rubber in cables, small parts, diaphragms, gaskets, and the like in such separated fields as space, oceanography, and medicine makes it very desirable to be able to bond silicone rubber to other resinous systems.

The particular primer composition set forth above is a thick paste but it will be appreciated that without the silicon dioxide the primer is a flowable liquid and in this form will find other applications.

The resulting bond strength is usually greater than the silicon rubber tear strength, this depending upon the type of epoxy system used and the temperature of the cure. The suggested epoxy type of the overcoat, whether it be an adhesive or not, is epichlorohydrin-bis(4-hydroxyphenyl-dimethylmethane). However, other types of epoxides such as novolac, epichlorohydringlycerol, and other known epoxides will also yield good bonds.

It has been found that high temperature epoxy systems for the overcoat yield higher bond strengths than do the room temperature cured epoxy systems. The bond strength also depends on the type of silicone rubber used. For instance, phenyl silicone yields higher bond strengths than methyl silicone.

The suggested maximum use temperature is approximately 130° C. but it has been found that good bond strengths are produced with use up to a temperature of 300° C. The chemical resistance of the epoxy-silicon interface is usually equal to that of the epoxy system or silicone system used, whichever is lower. The electrical resistance of the epoxy-silicone interface is somewhat lower than the epoxy system used and is polar.

Although exemplary embodiments of the invention have been disclosed herein for purposes of illustration, it will be understood that various changes, modifications, and substitutions may be incorporated in such embodiments without departing from the spirit of the invention.

I claim:

1. A method of forming a bond between an epoxy resin overcoat and a surface of cured silicone rubber, said method comprising:
   (a) applying a primer composition in a thin layer to the said surface of cured silicone rubber so as to form a primer coat, said primer composition including:
      (1) a liquid resinous epoxy material capable of polymerization;
      (2) a normally liquid vinyl aromatic material having the property of swelling the silicone rubber and capable of cross-linking with the resinous epoxy material; and
      (3) a normally liquid vinyl silane capable of wetting the silicone rubber and cross-linking with the resinous epoxy material;
      (4) said vinyl aromatic and said vinyl silane being present in amounts effective to accomplish bonding of the epoxy resin overcoat to the silicone rubber;
   (b) permitting the layer of primer composition to stand until the volatile components have substantially evaporated;
   (c) removing the excess of primer composition so as to leave a primer-treated surface on said silicone rubber;
   (d) applying over the primer-treated surface thus formed a polymerizable layer of a resinous epoxy system;
   (e) permitting the polymerizable resinous epoxy layer to polymerize to form a hard, infusible, epoxy resin overcoat;
   whereby the polymerization of said resinous epoxy layer initiates polymerization of the primer composition to form a bond between said silicone rubber and the epoxy overcoat.

2. A method in accordance with claim 1 which includes the step of abrading the silicone rubber surface prior to forming said bond.

3. A method in accordance with claim 1 wherein said aromatic material is present in an amount within the range of 0.5 to 0.8 part per weight per part of resinous epoxy material.

4. A method in accordance with claim 1 wherein said vinyl silane is present in an amount within the range of 0.5 to 1 part by weight per part of the resinous epoxy material.

5. A method in accordance with claim 1 wherein the vinyl aromatic material of the primer composition is vinyl toluene and said primer composition contains a volatile aromatic solvent which is capable of swelling the silicone rubber and which is supplied in an amount adequate to serve as a carrier for the other components of said primer composition.

6. A method in accordance with claim 5 wherein said solvent is toluene supplied in an amount within the range of 0.2 to 5 parts by weight per part of the resinous epoxy material.

7. A structure comprising:
   (a) a layer of cured silicone rubber;
   (b) a cured epoxy resin layer; and
   (c) a relatively thin layer intermediate the silicone rubber and the epoxy resin layers, said intermediate layer comprising a polymerized mixture of a resinous epoxy material, a vinyl silane, and a vinyl aromatic material, and further characterized by being bonded to the silicone rubber and to said cured epoxy resin layer.

8. The structure in accordance with claim 7 wherein said vinyl aromatic material is vinyl toluene.

9. A structure in accordance with claim 8 wherein said intermediate layer includes an acid anhydride hardener.

10. A structure in accordance with claim 7 wherein the polymerized mixture of the intermediate bonding layer contains 1-epoxyethyl-3,4-epoxycyclohexane, phthalic anhydride and vinyl tris(2-methoxyethoxy) silane.

References Cited

UNITED STATES PATENTS

| | | | |
|---|---|---|---|
| 2,907,671 | 10/1959 | Duvivier | 117—72 X |
| 2,945,776 | 7/1960 | Conguisti et al. | |
| 2,957,794 | 10/1960 | Shetterly et al. | 161—184 X |
| 2,979,420 | 4/1961 | Harper | 117—72 |
| 3,298,854 | 1/1967 | Marzocchi et al. | 117—72 |

WILLIAM D. MARTIN, Primary Examiner

R. HUSACK, Assistant Examiner

U.S. Cl. X.R.

117—72, 76, 102; 161—184, 206, 208

PO-1050
(5/69)

UNITED STATES PATENT OFFICE
CERTIFICATE OF CORRECTION

Patent No. 3,519,465      Dated July 7, 1970

Inventor(s) Marvin E. Lyles

It is certified that error appears in the above-identified patent and that said Letters Patent are hereby corrected as shown below:

Column 1, line 72, "primar" should read --primer--.

Column 3, line 1, "through" should be --thought--.

Column 4, line 55, "thta" should be --that--.

Column 6: Two references cited in parent case (Serial 492,873 filed October 4, 1965, now abandoned) have not been listed among the references, 3,299,166 - 1/1967 - Emblem et al 3,062,242 - 11/1962 - Vanderbilt

SIGNED AND SEALED

NOV 3 1970

(SEAL)
Attest:

Edward M. Fletcher, Jr.
Attesting Officer

WILLIAM E. SCHUYLER, JR.
Commissioner of Patents